(12) United States Patent
Wu et al.

(10) Patent No.: US 11,624,457 B2
(45) Date of Patent: Apr. 11, 2023

(54) HOLDER

(71) Applicant: Hilti Aktiengesellschaft, Schaan (LI)

(72) Inventors: Todd Wu, Shanghai (CN); Eric Schulte Suedhoff, Feldkirch (AT)

(73) Assignee: Hilti Aktiengesellschaft, Schaan (LI)

( * ) Notice: Subject to any disclaimer, the term of this patent is extended or adjusted under 35 U.S.C. 154(b) by 226 days.

(21) Appl. No.: 16/474,769

(22) PCT Filed: Dec. 14, 2017

(86) PCT No.: PCT/EP2017/082771
§ 371 (c)(1),
(2) Date: Jun. 28, 2019

(87) PCT Pub. No.: WO2018/121994
PCT Pub. Date: Jul. 5, 2018

(65) Prior Publication Data
US 2019/0346070 A1 Nov. 14, 2019

(30) Foreign Application Priority Data
Dec. 30, 2016 (CN) .......................... 201611250831.X

(51) Int. Cl.
*F16L 3/137* (2006.01)
*H02G 3/02* (2006.01)

(52) U.S. Cl.
CPC ................ *F16L 3/137* (2013.01); *H02G 3/02* (2013.01)

(58) Field of Classification Search
CPC . F16L 3/137; F16L 3/1233; F16L 3/13; F16L 3/12; H02G 3/02; H02G 3/32; B60R 16/0215
See application file for complete search history.

(56) References Cited

U.S. PATENT DOCUMENTS 2,415,517 A    2/1947  Morehouse
2,655,703 A *  10/1953 Flora .................... F16L 3/1233
                                              248/74.3
(Continued)

FOREIGN PATENT DOCUMENTS

CA      2 542 929 C    4/2012
CN      102792203 A   11/2012
(Continued)

OTHER PUBLICATIONS

DE-3941792-A1 Machine Translation (Year: 1990).*
(Continued)

*Primary Examiner* — Michael W Hotchkiss
(74) *Attorney, Agent, or Firm* — Crowell & Moring LLP

(57) ABSTRACT

A method of attaching a line to a support structure includes providing a holder having a fastening section, a side-part section, a closure section, and an engagement section, where the fastening section, the side-part section, and the engagement section define a ring having a gap. The method further includes fastening the fastening section to the support structure, bending the side-part section with respect to the fastening section after the fastening section has been fastened to the support structure, inserting the line through the gap into the ring, and bending the closure section with respect to at least one of the fastening section, the side-part section, and the engagement section such that the closure section engages the engagement section and closes the gap.

5 Claims, 3 Drawing Sheets

(56) References Cited

U.S. PATENT DOCUMENTS

| | | | |
|---|---|---|---|
| 2,972,461 A | 2/1961 | Balbach et al. | |
| 3,198,463 A * | 8/1965 | Loudon | F16L 3/12 248/62 |
| 3,804,359 A * | 4/1974 | Cumber | H02G 3/125 248/906 |
| 4,356,599 A * | 11/1982 | Larson | F16L 3/12 24/16 PB |
| 4,460,139 A * | 7/1984 | Boehen | F16L 3/1233 248/68.1 |
| 4,669,936 A * | 6/1987 | Camilleri | F16B 13/12 24/543 |
| 4,958,792 A * | 9/1990 | Rinderer | F16L 3/13 24/457 |
| 5,108,055 A * | 4/1992 | Kreinberg | F16L 3/13 24/703.1 |
| 5,533,696 A * | 7/1996 | Laughlin | F16L 3/12 248/74.1 |
| 5,582,058 A * | 12/1996 | Knudson | B21D 53/36 248/300 |
| 5,740,994 A * | 4/1998 | Laughlin | F16L 3/23 248/68.1 |
| 5,794,895 A * | 8/1998 | Besserer | H02G 3/263 248/73 |
| 5,820,048 A * | 10/1998 | Shereyk | F16L 3/1215 248/68.1 |
| 5,961,081 A * | 10/1999 | Rinderer | H02G 3/32 248/68.1 |
| 6,386,489 B1 * | 5/2002 | Gretz | F16L 3/233 174/72 A |
| 6,517,032 B1 * | 2/2003 | Gretz | F16L 3/23 248/62 |
| 6,565,048 B1 * | 5/2003 | Meyer | F16L 3/02 248/58 |
| 6,629,676 B1 * | 10/2003 | Gretz | F16L 3/222 348/304 |
| 6,655,644 B1 * | 12/2003 | Gretz | F16L 3/233 248/69 |
| 6,809,257 B2 * | 10/2004 | Shibuya | B60R 16/0215 174/481 |
| 7,207,529 B2 * | 4/2007 | Rosemann | F16L 3/23 248/71 |
| 7,387,282 B2 * | 6/2008 | Kovac | B60R 16/0215 248/55 |
| 7,407,138 B1 * | 8/2008 | Gretz | F16L 3/233 248/68.1 |
| 7,520,476 B2 * | 4/2009 | Caveney | H02G 3/0456 248/59 |
| 7,676,899 B2 * | 3/2010 | Journeaux | H02G 3/32 248/68.1 |
| 7,837,156 B1 * | 11/2010 | Handler | F16L 3/1218 248/339 |
| 7,887,012 B2 * | 2/2011 | Desai | H02G 3/32 248/55 |
| 8,387,927 B1 * | 3/2013 | Medlin, Jr. | H02G 3/32 52/715 |
| 8,616,512 B2 * | 12/2013 | McMath | H02G 3/32 248/304 |
| 9,010,696 B2 * | 4/2015 | Siddiqui | H02G 3/32 248/65 |
| 9,139,159 B1 | 9/2015 | Richter et al. | |
| 9,151,922 B2 | 10/2015 | Claessens et al. | |
| 9,209,614 B2 * | 12/2015 | Kara | H02G 3/32 |
| 9,835,272 B1 * | 12/2017 | Handler | H02G 3/0406 |
| 10,119,631 B2 * | 11/2018 | Toll | F16L 3/1058 |
| 10,125,801 B2 * | 11/2018 | Wilson | F16B 7/042 |
| 2003/0047649 A1 * | 3/2003 | Miescher | F16L 3/11 248/58 |
| 2003/0102412 A1 * | 6/2003 | Miescher | F16L 3/243 248/62 |
| 2005/0269462 A1 * | 12/2005 | Hauser | F16L 3/2235 248/67.7 |
| 2006/0131842 A1 * | 6/2006 | Meier | F16L 3/133 280/728.2 |
| 2007/0137882 A1 | 6/2007 | Journeaux et al. | |
| 2008/0142646 A1 * | 6/2008 | Magno | F16L 3/02 248/65 |
| 2009/0057498 A1 * | 3/2009 | Oh | F16L 3/1075 248/65 |
| 2009/0236477 A1 * | 9/2009 | Oh | H02G 7/06 248/65 |
| 2010/0102175 A1 * | 4/2010 | Dockery | H02G 3/32 248/62 |
| 2012/0321268 A1 | 12/2012 | Claessens et al. | |
| 2016/0114743 A1 * | 4/2016 | Miyamoto | F16L 3/1075 224/557 |
| 2017/0146154 A1 * | 5/2017 | Tally | F16L 3/222 |
| 2017/0227141 A1 * | 8/2017 | Toll | F16L 3/23 |

FOREIGN PATENT DOCUMENTS

| | | | |
|---|---|---|---|
| CN | 105270320 A | 1/2016 | |
| DE | 3941792 A1 * | 7/1990 | F16L 3/227 |
| DE | 295 03 361 U1 | 4/1995 | |
| DE | 200 04 342 U1 | 7/2001 | |
| DE | 20 2004 017 656 U1 | 3/2005 | |
| EP | 2541113 A1 * | 1/2013 | H02G 3/32 |
| EP | 2494245 B1 * | 1/2014 | F16L 3/12 |
| TW | M383867 U | 7/2010 | |

OTHER PUBLICATIONS

EP-2494245-B1 Machine Translation (Year: 2014).*
EP-2541113-A1 Machine Translation (Year: 2013).*
Obo Bettermann, "BSS Catalogue 2012/2013—Obo Bettermann—Fire protection systems", 2013, 7 total pages.
PCT/EP2017/082771, International Search Report dated Apr. 19, 2018 (Three (3) pages).
U.S. Patent Application, "Holder", filed Jun. 28, 2019, Inventor: Todd Wu et al.

* cited by examiner

HOLDER

TECHNICAL FIELD

The present invention relates to a holder for attaching a line to a support structure, and a method of attaching a line to a support structure.

BACKGROUND ART

Holders are known which are used for attaching lines, such as cables or tubes, to a support structure. Such holders may comprise a fastening section which is to be fastened to the support structure, one or two side-part sections extending perpendicularly from the fastening section, a closure section which is to be bent with respect to the fastening section or side-part section for closing the holder, and an engagement section for engaging the closure section when the holder is closed.

SUMMARY OF INVENTION

According to a first aspect of the invention, a method of attaching a line to a support structure, comprises the steps of providing a holder having a fastening section, a side-part section, a closure section, and an engagement section, the fastening section, side-part section, and engagement section defining a ring having a gap, fastening the fastening section to the support structure, bending the side-part section with respect to the fastening section after the fastening section has been fastened to the support structure, inserting the line through the gap into the ring, and bending the closure section with respect to at least one of the fastening section, side-part section, and engagement section, such that the closure section engages the engagement section and closes the gap. Bending the side-part section after fastening provides more space for the fastening step than in known devices.

According to an embodiment, the holder has a predetermined bending line, wherein the side-part section is bent with respect to the fastening section at the predetermined bending line. The predetermined bending line may contact the support structure after the fastening section has been fastened to the support structure. The fastening section and the side-part section may extend as far as the predetermined bending line and contact each other at the predetermined bending line.

According to a further embodiment, fastening the fastening section to the support structure includes placing the fastening section on the support structure, placing a fastening tool through the gap on the fastening section, and setting a fastening element into the support structure by the fastening tool, wherein the fastening element secures the fastening section on the support structure. The fastening tool, when placed on the fastening section, defines a fastening-tool space, and at least one of the side-part section, closure section, and engagement section, after the side-part section has been bent with respect to the fastening section, may overlap the fastening-tool space.

According to a further embodiment, the side-part section is bent with respect to the fastening section by 90°.

According to another aspect of the invention, a holder for attaching a line to a support structure comprises a fastening section, a side-part section, a closure section, and an engagement section, wherein the fastening section comprises a perforation for passage of a fastening element and a receptacle for receiving a nose of a fastening tool.

According to an embodiment, the perforation is separated from the receptacle by a distance.

According to a further embodiment, the receptacle is not perforated.

According to a further embodiment, the fastening section comprises a recess, wherein the perforation is located in the recess. The recess may overlap the receptacle.

According to a further embodiment, the fastening section, side-part section, and engagement section define a ring having a gap, wherein bending the closure section with respect to at least one of the fastening section, side-part section, and engagement section closes the gap.

According to another aspect of the invention, a holder for attaching a line to a support structure comprises a fastening section, a side-part section, a closure section, and an engagement section, wherein the closure section comprises a latch, and the engagement section comprises a passage defining an engagement direction, wherein the latch passes the passage in the engagement direction when the closure section engages the engagement section, wherein, in an unlocked position of the latch, the latch is free to pass the passage in the engagement direction or in an opposite direction of the engagement direction and, in a locked position of the latch, the latch is retained from passing the passage in the opposite direction, wherein the latch moves from the unlocked position to the locked position in a locking direction transverse to the engagement direction, and wherein the engagement section comprises a trap element which provides a resistance against movement of the latch from the locked position to the unlocked position.

According to an embodiment, the latch is spring biased in the opposite direction, wherein the trap element comprises a detent protruding in the engagement direction.

According to a further embodiment, the latch is spring biased in the locking direction.

According to a further embodiment, the fastening section, side-part section, and engagement section define a ring having a gap, wherein bending the closure section with respect to at least one of the fastening section, side-part section, and engagement section closes the gap.

BRIEF DESCRIPTION OF DRAWINGS

The invention will be described in more detail by way of example hereinafter with reference to the drawings. The described embodiments are only possible configurations in which the individual features may however be implemented independently of each other or may be omitted.

In the drawings.

DESCRIPTION OF EMBODIMENTS

Figure 1:
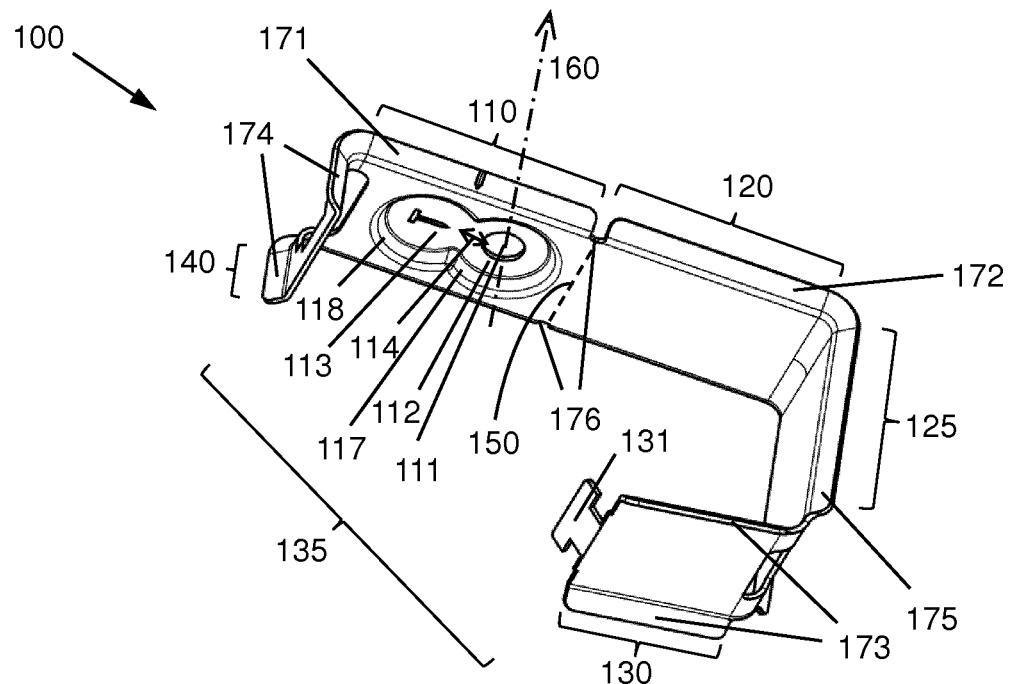
FIG. 1 is a perspective view of a holder according to a first embodiment of the present invention.
Figure 2:
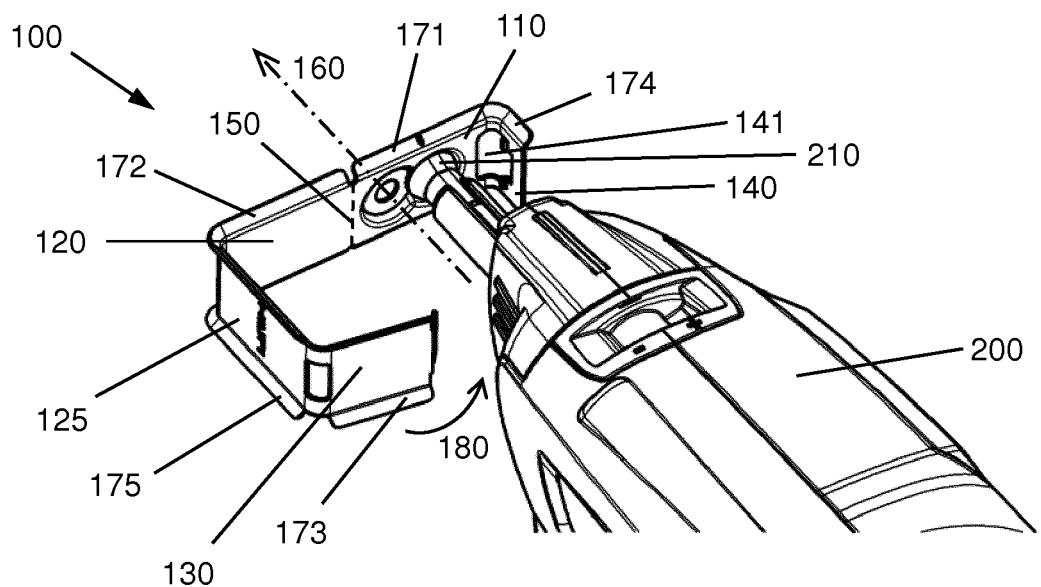
FIG. 2 is another perspective view of the holder shown in FIG. 1 while being fastened to a support structure.

FIGS. 1 and 2 show a holder 100 for attaching a line (not shown), such as a tube or a cable, to a support structure (not shown), such as a wall or a ceiling or a steel beam. The holder 100 comprises a fastening section 110, a side-part section 120, a closure section 130, and an engagement section 140. The holder further comprises an intermediate section 125 connecting the closure section 130 to the side-part section 120. The fastening section 110, side-part section 120, intermediate section 125, closure section 130, and engagement section 140 define a ring having a gap 135 between the closure section 130 and the engagement section 140.

The holder 100 is made from a sheet material, such as metal or an alloy, for example steel. The fastening section 110, side-part section 120, intermediate section 125, closure section 130, and engagement section 140 each have a generally flat shape defining a plane of orientation in space. The plane of orientation of the fastening section 110 defines a fastening direction 160 which is perpendicular to the plane of orientation of the fastening section 110. The plane of orientation of the engagement section 140 is bent with respect to the plane of orientation of the fastening section 110 by an angle of substantially 90°. Likewise, the plane of orientation of the intermediate section 125 is bent with respect to the plane of orientation of the side-part section 120 by an angle of substantially 90°. Likewise, the plane of orientation of the closure section 130 is bent with respect to the plane of orientation of the intermediate section 125 by an angle of substantially 90°. It shall be understood that the bending angles between the planes of orientation of two adjacent sections do not need to be the same. Also, bending angles different from 90° could also be contemplated.

FIG. 1 shows the holder 100 before it is fastened to the support structure, and FIG. 2 shows the holder 100 while it is fastened to the support structure. The fastening section 110 and the side-part section 120 are not yet bent with respect to each other. In the shown embodiment, the plane of orientation of the side-part section 120 is oriented in parallel to the plane of orientation of the fastening section 110. For this reason, the gap 135 is wider than in known devices, and the fastening section 110 is accessible in the fastening direction 160 through the gap 135 by a fastening tool. To this end, the side-part section 120, intermediate section 125, closure section 130, and engagement section 140, if projected perpendicularly onto the plane of orientation of the fastening section 110, do not overlap or cover the fastening section 110.

Lateral side edges 171 of the fastening section 110 are bent out of the plane of orientation of the fastening section 110. Likewise, lateral side edges 172 of the side-part section 120 are bent out of the plane of orientation of the side-part section 120. Likewise, lateral side edges 173 of the closure section 130 are bent out of the plane of orientation of the closure section 130. Likewise, lateral side edges 174 of the engagement section 140 are bent out of the plane of orientation of the engagement section 140. Likewise, lateral side edges 175 of the intermediate section 125 are bent out of the plane of orientation of the intermediate section 125. The lateral side edges 171, 172, 173, 174, 175 increase the stiffness of the holder 100. The lateral side edges 172 of the side-part section 120 are separated from the lateral side edges 171 of the fastening section 110 by notches 176. A virtual line between the notches 176 of the side edges 170 defines a predetermined bending line 150. The fastening section 110 and the side-part section 120 extend to the predetermined bending line 150 and contact each other at the predetermined bending line 150.

The fastening section 110 comprises a perforation 111 formed as a circular hole for passage of a fastening element, such as a screw or an anchor, in the fastening direction 160. The perforation 111 is located in a circular recess 112. The fastening section 110 further comprises a receptacle 113 which is not perforated. The recess 112 overlaps the receptacle 113, and the perforation 111 is separated from the receptacle 113 by a small distance 114. A side wall 117 of the recess 112 and a side wall 118 of the receptacle 113 extend out of the plane of orientation of the fastening section 110 in the fastening direction 160. In order to ensure that the recess 112 and the receptacle 113 contact the support structure when the holder 100 is applied against the support structure in the fastening direction 160, the side walls 117, 118 extend at least as far in the fastening section 160 as the lateral side edges 171 of the fastening section 110 do.

As shown in FIG. 2, the holder 100 may be fastened to the support structure by using a fastening tool 200 which may be a direct fastening tool which works without predrilling holes, such as a power nailer or power screwdriver. To this end, the holder 100 is fitted onto a nose 210 of the fastening tool 200 such that the nose 210 is received in the receptacle 113 of the holder 100. In a preferred fastening system comprising the fastening tool 200 and the holder 100, the dimensions of the receptacle 113 are adapted to the dimensions of the nose 210 such that the holder 100 is temporarily held on the fastening tool 200 when the nose 210 is received in the receptacle 113. The fastening tool 200, together with the holder 100 fitted on the nose 210, is then pressed against the support structure, such that the fastening section 110, and in particular the receptacle 113, is placed on the support structure. Then, the fastening tool 200 is triggered to set a fastening element (not shown), in the fastening direction 160, through the receptacle 113 into the support structure, the fastening element thereby securing the fastening section 110 on the support structure.

After the fastening section 110 has been fastened to the support structure, a line, such as a tube or cable, is inserted through the gap 135 into the ring. Then, the side-part section 120, together with the intermediate section 125 and the closure section 130 is bent with respect to the fastening section 110, in a bending direction 180, such that the closure section 130 engages the engagement section 140 and closes the gap 135. In particular, a latch 131 of the closure section 130 engages a passage 141 of the engagement section 140. The line is thereby securely held within the holder 100 and attached to the support structure.

Preferably, the side-part section 120 is bent with respect to the fastening section 110 at the predetermined bending line 150, in particular by 90°. As shown in FIG. 2, the fastening tool 200, when placed on the fastening section 110, defines a fastening-tool space. While closing the gap 135, and/or after the gap 135 has been closed, the closure section 130 and the intermediate section 125 overlap the fastening-tool space. After the gap 135 has been closed, the holder 100 has a generally rectangular shape, wherein the fastening section 110 and the intermediate section 125 form a first pair of opposite sides of the rectangle, and the side-part section 120 and the closure and engagement sections 130, 140 form a second pair of opposite sides of the rectangle.

Figure 3:
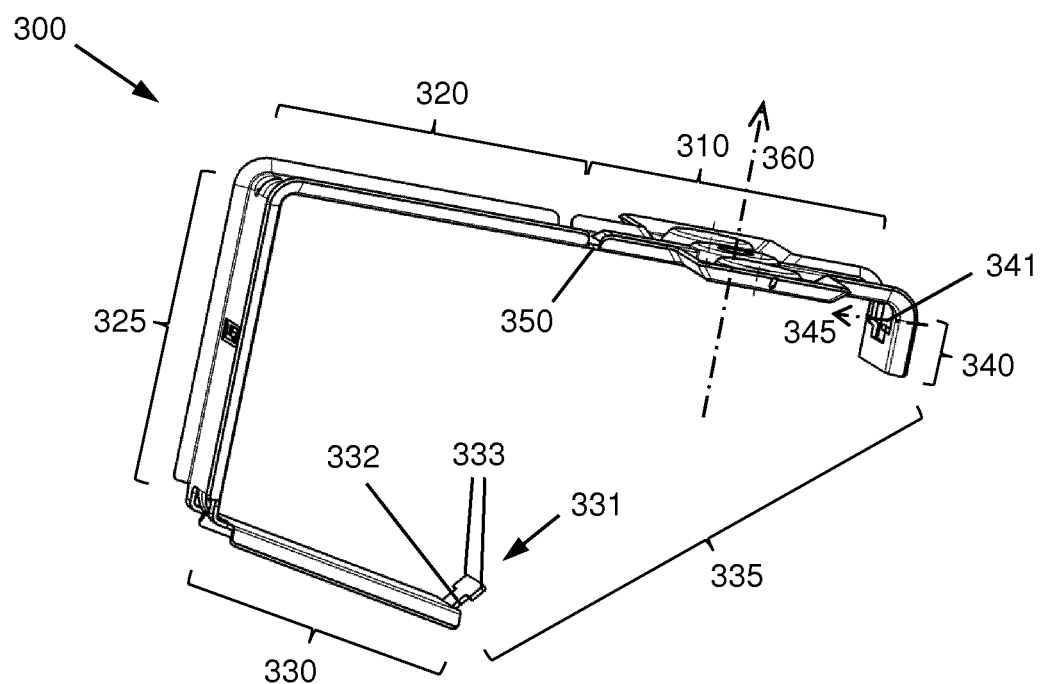
FIG. 3 is a perspective view of a holder according to a second embodiment of the present invention.
Figure 4:
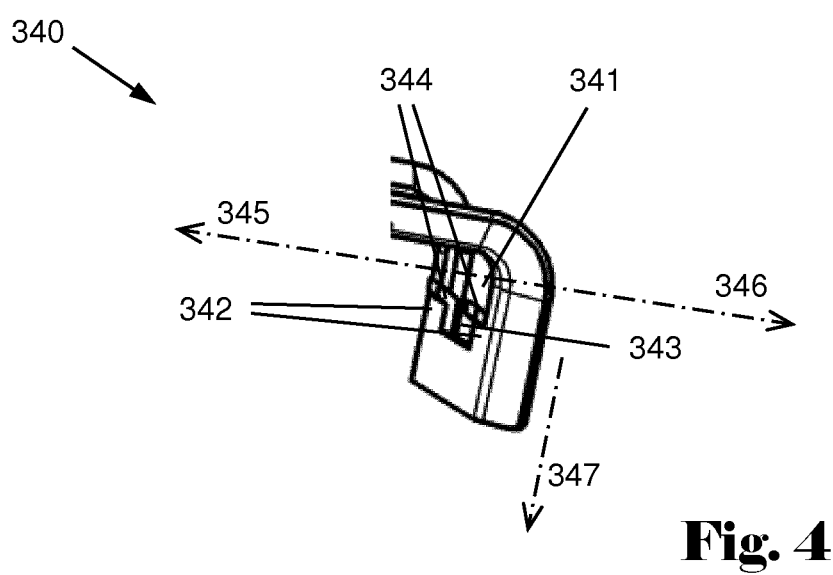
FIG. 4 is an enlarged partial view of the holder shown in FIG. 3.
Figure 5:
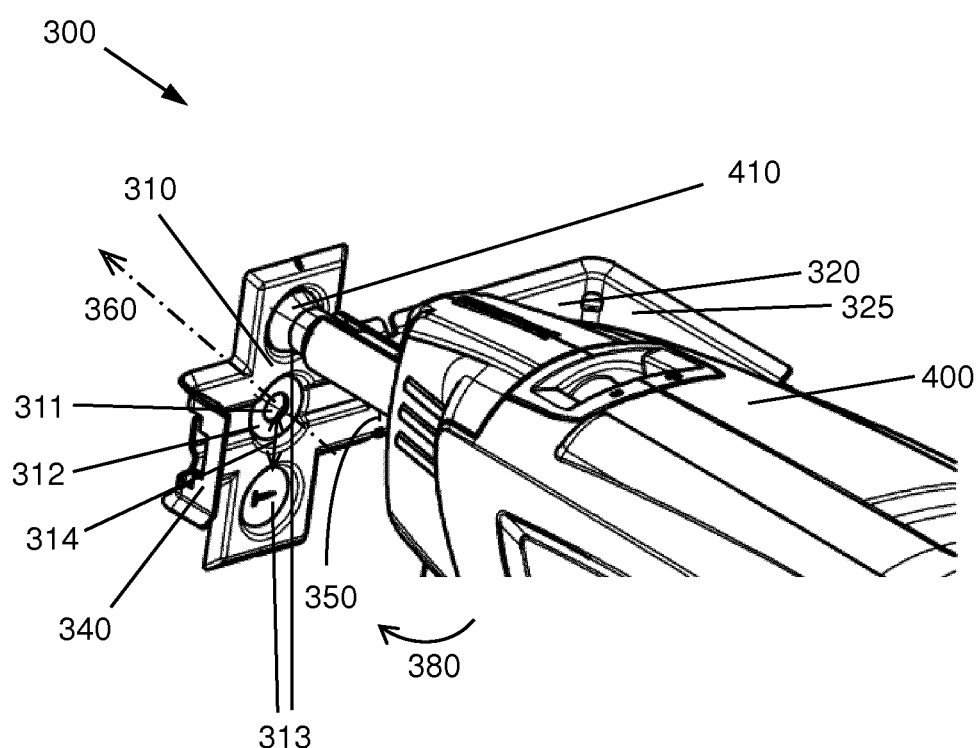
FIG. 5 is another perspective view of the holder shown in FIG. 3 while being fastened to a support structure.

FIGS. 3, 4 and 5 show a holder 300 for attaching a line (not shown), such as a tube or a cable, to a support structure (not shown), such as a wall or a ceiling or a steel beam. The holder 300 comprises a fastening section 310, a side-part section 320, a closure section 330, and an engagement section 340. The holder further comprises an intermediate section 325 connecting the closure section 330 to the side-part section 320. The fastening section 310, side-part section 320, intermediate section 325, closure section 330, and engagement section 340 define a ring having a gap 335 between the closure section 330 and the engagement section 340.

The holder 300 is made from a sheet material, such as metal or an alloy, for example steel. The fastening section 310, side-part section 320, intermediate section 325, closure section 330, and engagement section 340 each have a generally flat shape defining a plane of orientation in space. The plane of orientation of the fastening section 310 defines a fastening direction 360 which is perpendicular to the plane of orientation of the fastening section 310. The plane of orientation of the engagement section 340 is bent with respect to the plane of orientation of the fastening section 310 by an angle of substantially 90°. Likewise, the plane of orientation of the intermediate section 325 is bent with respect to the plane of orientation of the side-part section 320 by an angle of substantially 90°. The plane of orientation of the closure section 330 is bent with respect to the plane of orientation of the intermediate section 325 by an angle of less than 90°, preferably by an angle of substantially 75°.

FIG. 3 shows the holder 300 before it is fastened to the support structure, and FIG. 5 shows the holder 300 while it is fastened to the support structure. The fastening section 310 and the side-part section 320 are not yet bent with respect to each other. For this reason, the fastening section 310 is accessible in the fastening direction 360 through the gap 335 by a fastening tool. To this end, the side-part section 320, intermediate section 325, closure section 330, and engagement section 340, if projected perpendicularly onto the plane of orientation of the fastening section 310, do not overlap or cover the fastening section 310.

The fastening section 310 comprises a perforation 311 formed as a circular hole for passage of a fastening element, such as a screw or an anchor, in the fastening direction 360. The perforation 311 is located in a circular recess 312. The fastening section 310 further comprises two receptacles 313 which are not perforated. The perforation 311 is separated from the receptacle 313 by a distance 314.

As shown in FIG. 5, the holder 300 may be fastened to the support structure by using a fastening tool 400. To this end, the holder 300 is fitted onto a nose 410 of the fastening tool 400 such that the nose 410 is received in one of the receptacles 313 of the holder 300. The fastening tool 400, together with the holder 300 fitted on the nose 410, is then pressed against the support structure, such that the fastening section 310 is placed on the support structure. Then, the fastening tool 400 is triggered to set a fastening element (not shown), in the fastening direction 360, through the one of the receptacles 313 into the support structure, the fastening element thereby securing the fastening section 310 on the support structure.

After the fastening section 310 has been fastened to the support structure, a line, such as a tube or cable, is inserted through the gap 335 into the ring. Then, the side-part section 320, together with the intermediate section 325 and the closure section 330 is bent with respect to the fastening section 310, in a bending direction 380, such that the closure section 330 engages the engagement section 340 and closes the gap 335. The line is thereby securely held within the holder 300 and attached to the support structure via the holder 300.

To this end, the closure section 330 comprises a latch 331, and the engagement section 340 comprises a passage 341 defining an engagement direction 345. The latch 331 passes the passage 341 in the engagement direction 345 when the closure section 330 engages the engagement section 340. The latch 331 has a neck 332 and two protrusions 333, and the engagement section 340 has two locking elements 342 extending into the passage 341 and defining a clearance 343 between the two locking elements 342, wherein the clearance 343 is part of the passage 341. In an unlocked position of the latch 331, the protrusions 333 of the latch 331 do not overlap the locking elements 342 of the engagement section 340, if viewed in the engagement direction 345. Accordingly, the latch 331 is free to pass the passage 341 in the engagement direction 345 or in an opposite direction 346 of the engagement direction 345. In a locked position of the latch 331, the neck 332 extends through the clearance 343 and the protrusions 333 of the latch 331 do overlap the locking elements 342 of the engagement section 340, if viewed in the engagement direction 345. Accordingly, the latch 331 is retained from passing the passage 341 in the opposite direction 346.

The latch 331 moves from the unlocked position to the locked position in a locking direction 347 transverse to the engagement direction 345, preferably perpendicular to the engagement direction 345. In order to provide a resistance against movement of the latch 331 from the locked position to the unlocked position, the engagement section 340 comprises two trap elements 344 each formed as a detent protruding from one of the locking elements 342, respectively, in the engagement direction 345.

Preferably, the side-part section 320 is bent with respect to the fastening section 310 at a predetermined bending line 350, in particular by 90°. After the gap 335 has been closed, the holder 300 has a generally rectangular shape, wherein the fastening section 310 and the intermediate section 325 form a first pair of opposite sides of the rectangle, and the side-part section 320 and the closure and engagement sections 330, 340 form a second pair of opposite sides of the rectangle.

Since the material of the holder 300 is resilient to some extent, each bending of the holder 300 is, at least in part, an elastic deformation. Therefore, after engaging the closure section 330 with the engagement section 340, the holder 300 is mechanically tensioned. Due to the bending of the side-part section 320 with respect to the fastening section 310, the tension of the holder 300 provides a spring force biasing the latch 331 in the locking direction 347, thereby pulling the latch 331 into the locking position. Due to the bending of the closure section 330 with respect to the intermediate section 325 (from 75° to 90°), the tension of the holder 300 provides a spring force biasing the latch 331 in the opposite direction 346, thereby pushing the protrusions 333 against the trap elements 344 and increasing the resistance against movement of the latch 331 from the locked position to the unlocked position.

While the invention has been described with reference to its preferred embodiments, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

The invention claimed is:

1. A method of attaching a line to a support structure, comprising the steps of:
   providing a holder having a fastening section, a side-part section, a closure section, an engagement section, and an intermediate section disposed between the closure section and the side-part section and connecting the closure section to the side-part section, wherein each of the sections has a flat shape defining a respective plane of orientation, wherein the plane of orientation of the intermediate section is bent with respect to the plane of orientation of the side-part section by an angle of substantially 90°, wherein the plane of orientation of the intermediate section is bent with respect to the plane of orientation of the closure section by an angle of substantially 90°, wherein the side-part section and the intermediate section are disposed between the fastening section and the closure section, wherein the fastening section, the side-part section, the intermediate section, the closure section, and the engagement section define a ring having a gap between the closure section and the engagement section, and wherein the fastening section, the side-part section, the intermediate section, the closure section, and the engagement section each have respective lateral side edges that are bent out of the respective plane of orientation of the respective sections;

fastening the fastening section to the support structure by a fastening element, wherein the fastening section has a perforation formed as a circular hole, wherein the perforation is disposed in a circular recess, wherein the fastening section has a receptacle which is not perforated, wherein the circular recess overlaps the receptacle, and wherein the perforation is separated from the receptacle by a distance;

bending the side-part section with respect to the fastening section after the fastening section has been fastened to the support structure, wherein the holder has a predetermined bending line, wherein the lateral side edges of the side-part section are separated from the lateral side edges of the fastening section by notches and wherein a virtual line between the notches define the predetermined bending line, wherein the bending of the side-part section with respect to the fastening section includes bending at the predetermined bending line, and wherein the predetermined bending line contacts the support structure after the fastening of the fastening section to the support structure;

inserting the line through the gap into the ring; and bending the closure section with respect to at least one of the fastening section, the side-part section, and the engagement section such that the closure section engages the engagement section and closes the gap.

2. The method according to claim 1, wherein the fastening section and the side-part section extend as far as the predetermined bending line and contact each other at the predetermined bending line.

3. The method according to claim 1, wherein the step of bending the side-part section with respect to the fastening section includes bending the side-part section by 90°.

4. The method according to claim 1, wherein the step of fastening the fastening section to the support structure includes placing the fastening section on the support structure, placing a fastening tool through the gap on the fastening section, and setting the fastening element through the receptacle of the fastening section into the support structure by the fastening tool, wherein the fastening element secures the fastening section on the support structure.

5. The method according to claim 4, wherein the fastening tool, when placed on the fastening section, defines a fastening-tool space and wherein at least one of the side-part section, the closure section, and the engagement section, after the side-part section has been bent with respect to the fastening section, overlaps the fastening-tool space.

\* \* \* \* \*